United States Patent [19]

Pascoe et al.

[11] Patent Number: 5,778,369

[45] Date of Patent: Jul. 7, 1998

[54] METHOD AND APPARATUS FOR MANAGING EXCEPTIONS

[75] Inventors: Christopher James Pascoe, Pflugerville; Gregory Alan Wilson, Austin, both of Tex.

[73] Assignee: International Business Machines Corporation, Armonk, N.Y.

[21] Appl. No.: 516,736

[22] Filed: Aug. 18, 1995

[51] Int. Cl.[6] ................................................ G06F 17/30
[52] U.S. Cl. ............................ 707/100; 707/205; 371/21.6
[58] Field of Search .................................. 395/611, 621, 395/704, 683, 684; 707/100, 101, 25; 371/21.6

[56] References Cited

U.S. PATENT DOCUMENTS

| | | | |
|---|---|---|---|
| 5,182,811 | 1/1993 | Sakamura | 395/800 |
| 5,257,269 | 10/1993 | Hamauchi | 395/183.19 |
| 5,291,583 | 3/1994 | Bapat | 395/500 |
| 5,295,256 | 3/1994 | Bapat | 395/500 |
| 5,404,529 | 4/1995 | Chernikoff et al. | 395/683 |
| 5,408,218 | 4/1995 | Svedberg et al. | 340/507 |
| 5,418,793 | 5/1995 | Chang et al. | 371/27 |
| 5,606,696 | 2/1997 | Ackerman et al. | 395/678 |
| 5,628,016 | 5/1997 | Kukol | 395/704 |

Primary Examiner—Maria N. Von Buhr
Attorney, Agent, or Firm—Jeffrey S. LaBaw; Andrew J. Dillon

[57] ABSTRACT

A method and apparatus for managing exceptions occurring during an execution of a plurality of objects in an object oriented environment. Under the present invention a message from an object is received in which the message requires processing by the plurality of objects. Error information is stored in a data structure in response to each occurrence of an error in each of the plurality of objects. This data structure is returned to the object.

19 Claims, 8 Drawing Sheets

METHOD AND APPARATUS FOR MANAGING EXCEPTIONS

BACKGROUND OF THE INVENTION

1. Technical Field

The present invention relates in general to an improved data processing system, and in particular, to an improved method for managing errors in a data processing system. Still more particularly, the present invention relates to an improved method and apparatus for managing errors occurring when a plurality of objects are called in response to a request.

2. Description of the Related Art

The development of application and system software for data processing systems has traditionally been a time consuming task. The field of software engineering has attempted to overcome the limitations of traditional techniques by proposing new, more efficient software development models. Object oriented programming has emerged as a promising technology that will allow rapid development, implementation and customization of objects. Each new object has certain data attributes and processes or methods that operate on that data. Data is said to be "encapsulated" by an object and can only be modified by the object methods invoked by sending a message to an object identifying the method and supplying any needed arguments.

Object oriented systems have two important properties in addition to encapsulation. "Inheritance" is the ability to derive a new object from an existing object and inherit all properties, including methods and data structures, from the existing object. The new object may have certain unique features which are supplied as overrides or modifications to the existing class. For example, a new subclass needs to specify only the functions and data that distinguish that class from the existing more general class.

The ability to override an existing method description enables polymorphism, the ability to have a single message received by an object be processed in different ways depending on the object itself.

Inheritance and polymorphism create a powerful structure for implementing new software systems. The software developer does not have to develop each piece of a system, he or she need only specify the unique features of the system.

The power of object oriented systems is realized through the development of system "frameworks." A framework is a collection of base classes that can be used by a system implementor to create a final systems product. The framework is defined and developed to work together as a system. Conceptually, the framework is much like a set of standard hardware components used by computer hardware builders. Each of the components has certain defined functions and interfaces and the engineer assembles these components according to a particular design to create a unique hardware system. More information on object oriented systems may be found in Booch, *Object Oriented Design With Applications*, Benjamin/Cummings Publishing Company, Inc. (1991).

One object oriented programming system is the System Object Model (SOM). More information on SOM can be found in SOMobjects Developer Toolkit User's Guide, version 2.0, June 1993, available from International Business Machines Corporation.

In today's computer software environments, code is developed using a modular approach whenever possible. Future software environments will continue to use a modular approach, yielding the concept of reusable software components. This reusability spans many competing layers starting with the operating system, moving up through network transports, distributed computing layers, and finally into application components like spell checkers, search engines, and databases.

In the Distributed Computing Environment (DCE), various software components may be located on more than one physical system, such as a number of computers in a distributed data processing system. Examples of such services include security, directory, and time services. These various components use each other's services by making internal calls to one another (in the form of messages sent from one object to another object) as a way of satisfying a request for a particular service. For example, when an application invokes a security component requesting the addition of a new user to the security registry database, the message requesting an addition of a new user results in other messages being made to other parts of the security component to check that the component making this request is authorized to add users to the database, which in turn uses a remote procedure call (RPC) component to transmit those requests to the appropriate service.

Such a modular software component environment provides programmers with clean, well-defined interfaces for requesting services needed by an application. A problem, however, occurs when a call to one of these components returns a message to the caller which is originated by a component not directly invoked by the programmer or user, but by some other component that was called to complete the programmer's request. In such an instance, the message returned to the programmer or user can be misleading because it does not return information that is expected by the programmer or user. The chain of calls to various components may be long in many cases in which any one of the components called in the chain of calls can return an error message.

In some cases, such as user interface code, the caller to the underlying software components would like to identify all the problems found with the data input by the end user. For example, if in turning back to the situation in which a call is made to add a new user to a security registry database, several properties about the user (i.e. name, address, location, and phone), are entered into the user interface. Once all the data has been entered, it is saved and processed. If validation problems with one or more of the entries occurs, it is desirable to provide information on all problems to the user entering information at one time, rather than requiring the user to fix one problem, save it, and then be presented with another problem to be fixed.

Therefore, it would be advantageous to have an improved method and apparatus for identifying errors occurring in response to a call or request.

SUMMARY OF THE INVENTION

It is an object of the present invention to provide an improved data processing system.

It is another object of the present invention to provide an improved method for managing errors in a data processing system.

It is yet another object of the present invention to provide an improved method and apparatus for managing errors occurring when a plurality of objects are called in response to a request.

The present invention provides a method and apparatus for managing exceptions occurring during an execution of a plurality of objects in an object oriented environment. Under the present invention a message from an object is received in which the message requires processing by the plurality of objects. Error information is stored in a data structure in response to each occurrence of an error in each of the plurality of objects. This data structure is returned to the object.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
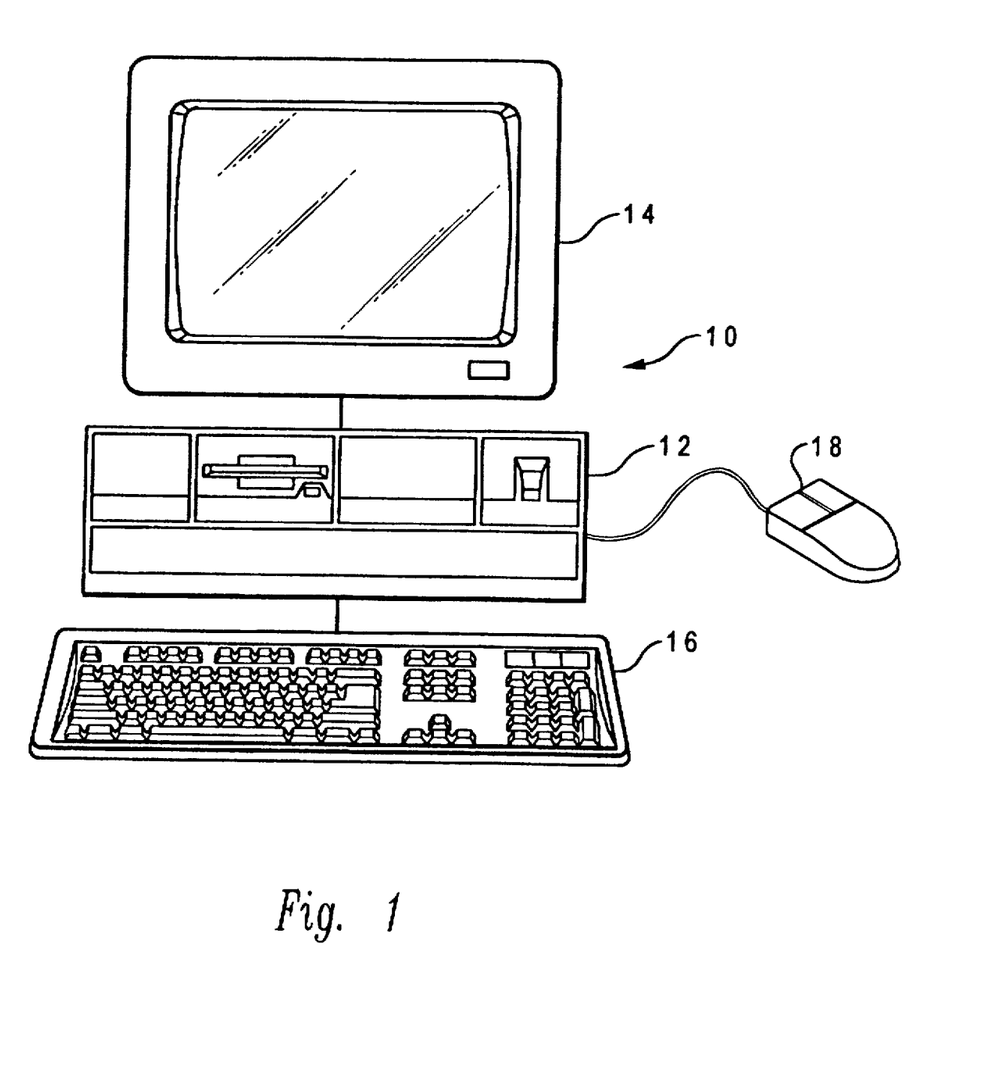
FIG. 1 depicts a data processing system in the form of a personal computer in which the present invention can be employed.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. "OS/2" is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
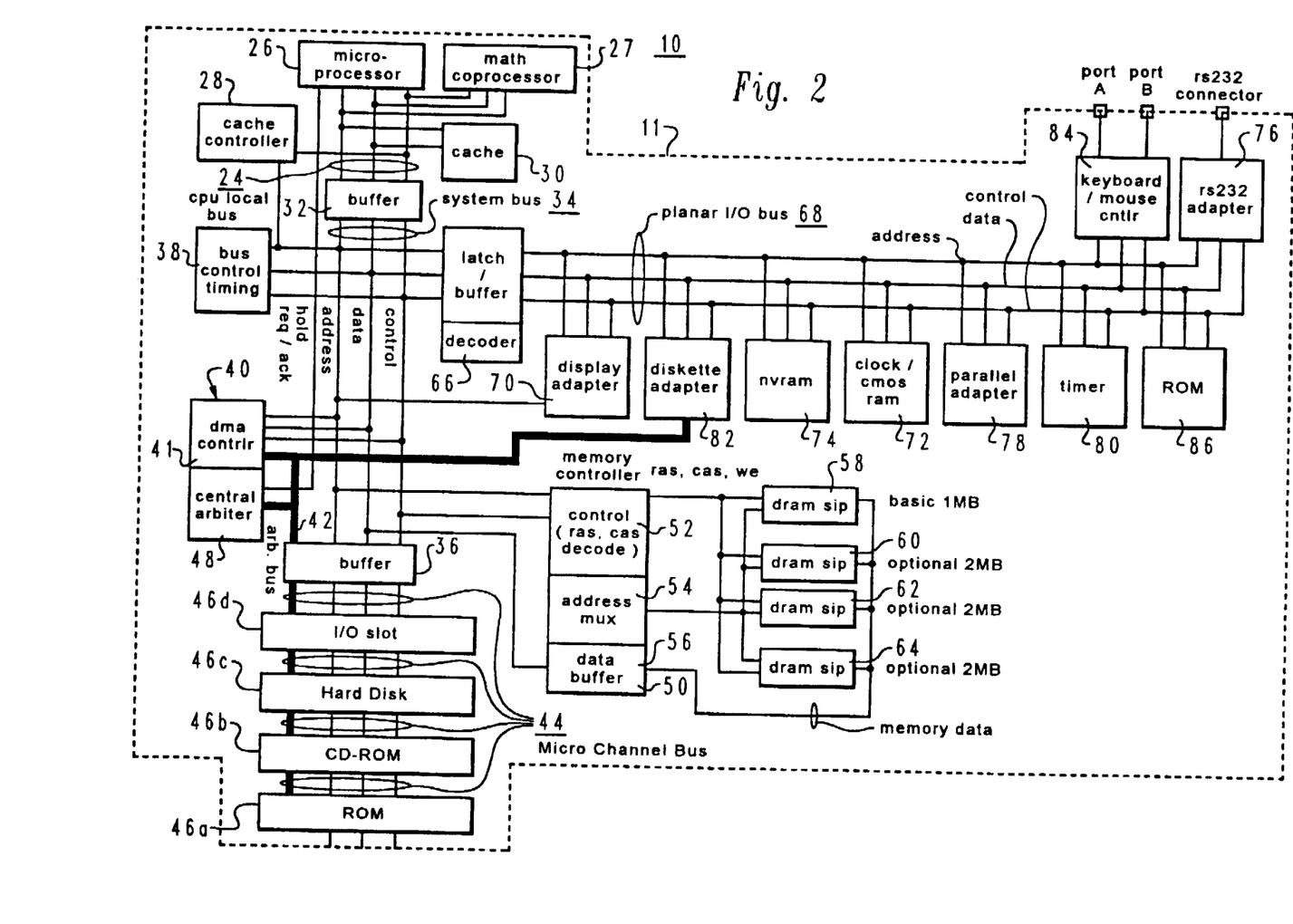
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80386, 80486 or Pentium microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as a Peripheral Component Interface (PCI) bus 44. Connected to bus 44 are a plurality of I/O slots 46a–46d for receiving adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

The processes depicted in FIGS. 4–8 may be implemented by those of ordinary skill in the art within the data processing system depicted in FIGS. 1 and 2. The processes depicted in these figures may be implemented in a SOM system incorporating exception handling following the Common Object Request Broker Architecture (CORBA). More information on CORBA may be found in *The Common Object Request Broker: Architecture and Specification*, published by Object Management Group (OMG) and X/Open.

The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

Figure 3:
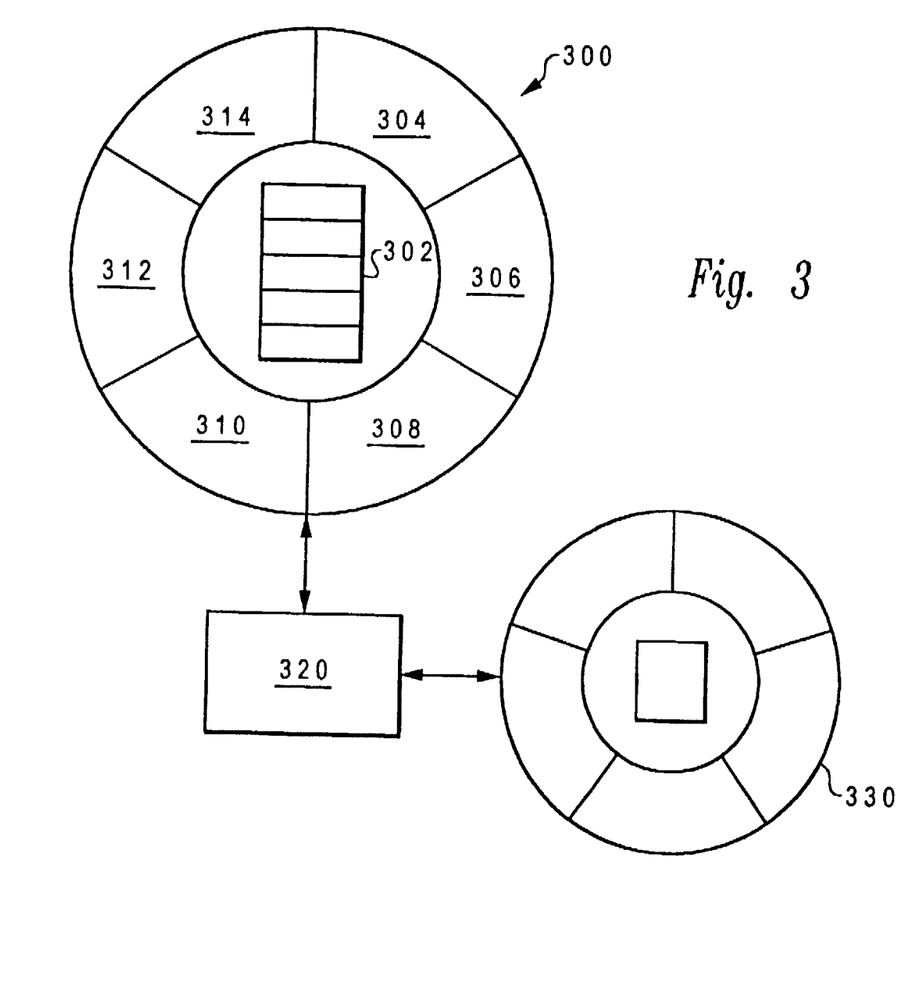
FIG. 3 is a diagram of objects in an object oriented system is depicted in accordance with a preferred embodiment of the present invention.

With reference to FIG. 3, a diagram of objects in an object oriented system is depicted in accordance with a preferred embodiment of the present invention. An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 320 that routes messages between objects. Thus, object 330 causes Method C 308 to be invoked by sending a message 332 to message router 320 that in turn sends message 322 to Method C 308 of object 300.

Object frameworks are constructed to provide a set of objects for application and system developers to use to construct a delivered system. The IBM System Object Model (SOM) framework, for example, provides a language independent set of objects for use in systems development.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

Figure 4A:
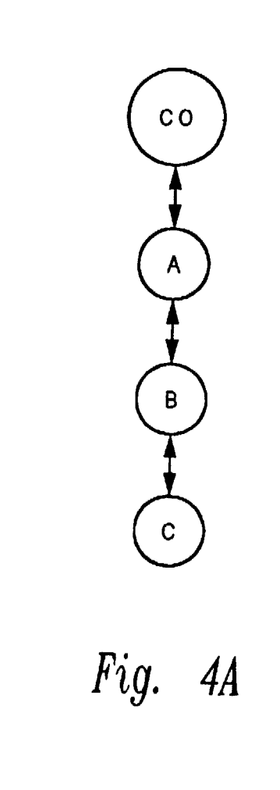
FIGS. 4A is a block diagram of a client object, CO, object A, object B, and object C according to the present invention.
Figure 4B:
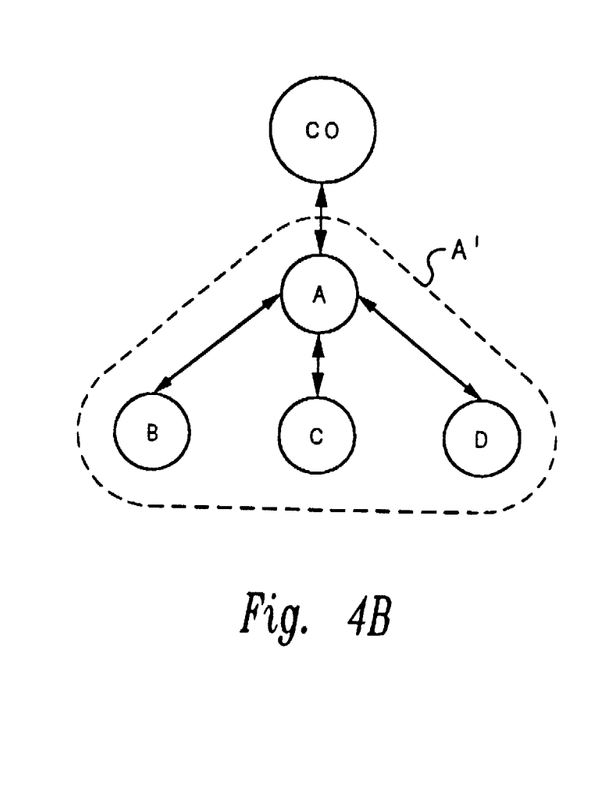
FIG. 4B is a block diagram of a client object, CO, object A, object B, object C, and object D according to the present invention.

Turning now to FIGS. 4A and 4B, block diagrams of a client object, CO, object A, object B, and object C are depicted according to the present invention. In the depicted examples, client object CO is a client application or program in an object oriented environment that sends a message in response to some input or request received by client object CO. FIG. 4A is an example of a vertical exception scenario in which different errors may occur down a chain of messages to different objects. In FIG. 4A, client object CO sends a message, to object A. In environments other than object oriented environments, such a message is often called a "call." The message sent to object A invokes an operation upon object A to elicit some reaction from this object. Object A is unable to entirely process the message from client object CO and provide the desired response without sending messages to other objects.

In this depicted example, object A sends a message to object B and in turn, object B sends a message to object C to provide the response required by the message sent from client object CO. Previously, if an error is encountered by object C, this error is passed back through objects B and A to client object CO, which can provide a cryptic message for user using client object CO. According to the present invention, object C passes the error or exception to object B, which in turn may add additional error messages depending on the exception returned by object C to object B. Object B then returns the data structure containing the exception from object C and any additional information that it may have added to the data structure. Object A then returns the data structure to client object CO including any additional information that it may have added to the data structure in response to receiving the data structure containing the exception from object B.

FIG. 4B is a block diagram of client object, CO, and objects A-D. This figure provides an example of a horizontal exception scenario in which client object CO sends a message to object A, in turn, sends the message to objects B, C, and D. From client object CO's perspective the message was sent to set A which returns all exceptions associated with processing the message from client object CO. In this instance, each of the objects receiving a message from client object CO will provide a response, which may include an exception. In this situation, the present invention will store all of the exceptions returned in a data structure prior to returning the data structure to the client object.

An exception structure is a structure that contains an exception message with a pointer to a stack of zero or more exception messages. These messages are in the form of a CORBA sequence similar to an array in the depicted example.

Figure 5:
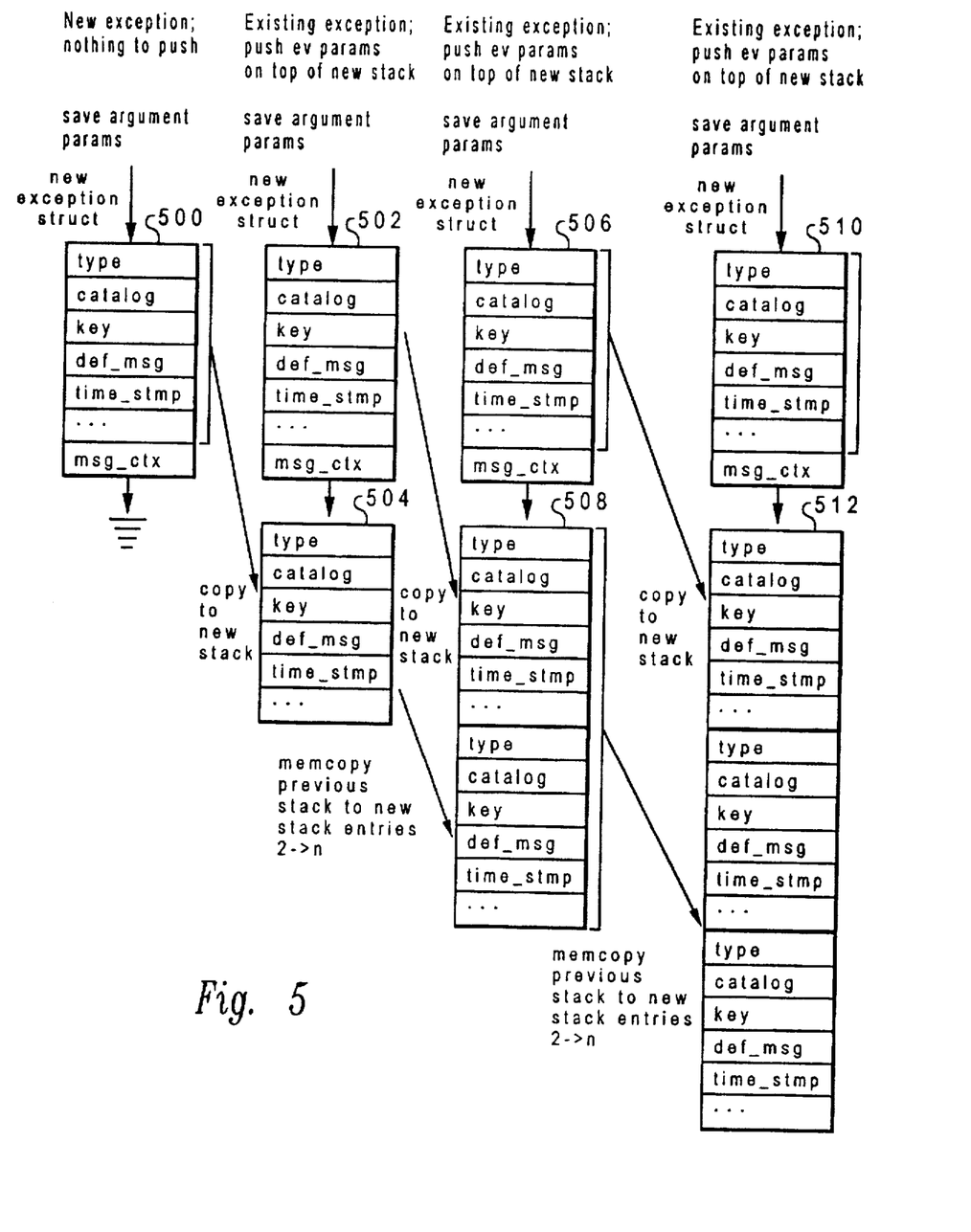
FIG. 5 is a diagram of data structures illustrating a mechanism for reporting errors or exceptions according to the present invention.

Turning now to FIG. 5, a diagram of data structures illustrating a mechanism for reporting errors or exceptions is depicted according to the present invention. FIG. 5 depicts how exceptions are saved and passed between objects according to the present invention. An error occurs when code does not execute properly or as expected, and an exception is the information describing the error. In response to a first exception, an exception structure 500 is created and arguments and parameters are saved to this data structure. An "exception structure" is a structure that contains an exception message with a pointer to a stack of zero or more exception messages. These messages are in the form of a CORBA sequence similar to an array in the depicted example.

In the depicted example, the exception message includes an entry for type, which indicates the resource manage-message type, suggest for example, OS/2. The catalog entry is the name of the catalog containing the message to be added to the exception. The key entry indicates the resource manager unique message identity for the message being added to the exception. The fourth entry, def__msg is an entry for the default message text. The time stamp entry indicates the date and time the message was reported. Other various entries not depicted in this example may be employed in exception structure 500. The last entry in the depicted example is a pointer msg__ctx. Initially, pointer msg__ctx does not point to any other data structure when only one exception has occurred.

In response to a second exception, exception structure 502 is created. Exception structure 502 is similar to exception structure 500, however, pointer msg__ctx now points to stack 504, which is an exception message that stores the data from exception structure 500. A "stack" is a data structure that supports an ability to push/pop multiple objects onto or off of the top of the data structure in a last-in-first-out (LIFO) method. In response to a third exception, exception structure 506 is created in which pointer msg__ctx points to stack 508 in which the exception message from exception structure 502 is copied to the top of the stack and a copy of the previous data structure, stack 504 is copied below these entries in stack 508. In response to an Nth exception, exception structure 510 is created containing the exception occurring at this particular object with pointer msg__ctx pointing to stack 512, which contains data from exception structure 506 at the top of stack 512 and a copy of stack 508 below it. Thus, exception structure 510 and stack 512 form a data structure that is passed back to the client object, such as client object CO in FIGS. 4A and 4B. All of the exceptions are present for examination and analysis.

Figure 6:
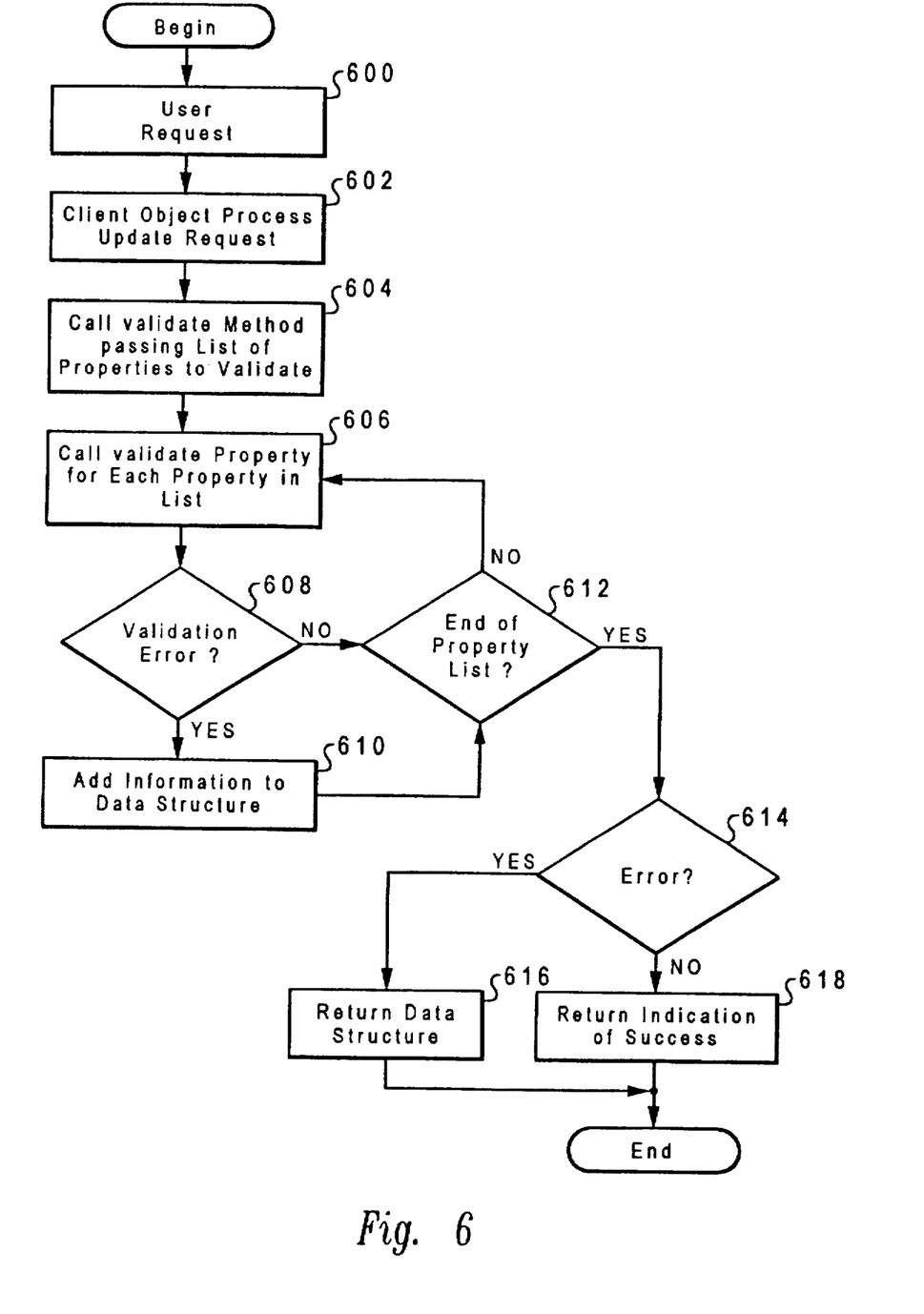
FIG. 6 is a flowchart of a process for managing exceptions occurring in a horizontal fashion according to a preferred embodiment of the present invention.

Turning now to FIG. 6, a flowchart of a process for managing exceptions occurring in a horizontal fashion is depicted according to a preferred embodiment of the present invention. The process begins by receiving a user request in the form of an update request at the client object (step 600). Such a request may be to update one or more properties (i.e., password, account expiration, date, minimum password length, etc.) for an object such as an account object. The client object processes the client update request (step 602).

In processing a request, the client object may send messages to a number of different objects to validate properties passed in the request. An error has now occurred. Each object then validates a property that has been unprocessed in the list (step 606). A determination is made as to whether an error has occurred in validation (step 608). If an error has occurred in validation, a message is sent to add information into the data structure (step 610). Thereafter, a determination is made as to whether the end of the property list has been reached (step 612). If the end of the property list has not been reached, the next unprocessed property in the list is processed to validate it back in step 606. If the end of the property list has been reached, a determination is made as to whether an error has occurred during processing (step 614). If an error has occurred, the data structure, including an exception structure and a stack, is returned for the caller's use (step 616). If an error has not occurred, a message indicating success is returned to the caller (step 618)

Figure 7:
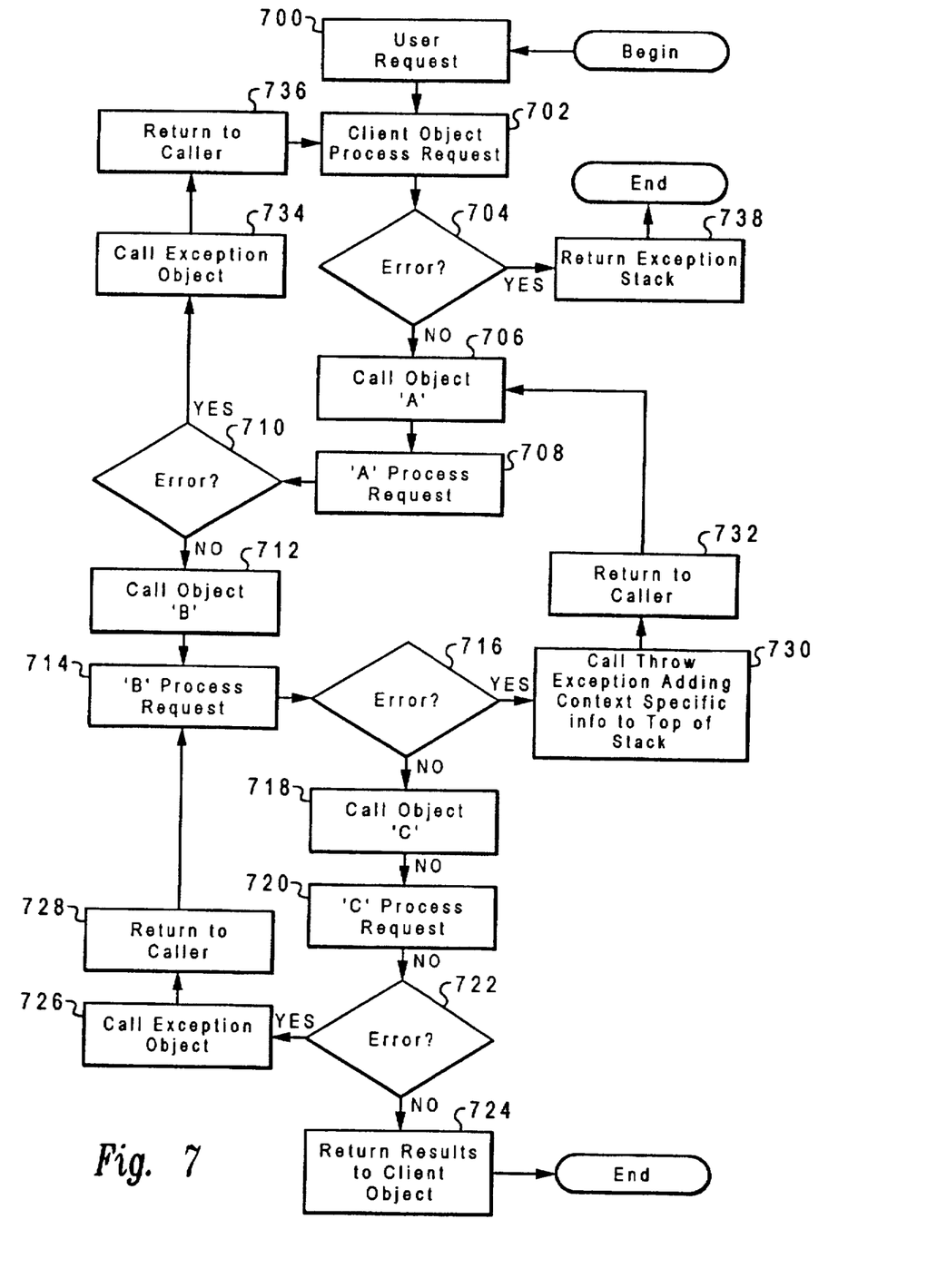
FIG. 7 is a flowchart of a process for processing exceptions occurring in a vertical fashion according to a preferred embodiment of the present invention.

Turning now to FIG. 7, a flowchart of a process for processing exceptions occurring in a vertical fashion is depicted according to a preferred embodiment of the present invention. The process begins by receiving a user request (step 700). Thereafter, the client object processes the request (step 702). In processing the request, a determination is made as to whether an error has occurred (step 704). If an error has not occurred, the client object CO sends a message to object A to process the request (step 706). Object A processes the request from the client object (step 708).

Next, a determination is made as to whether an error has occurred in the processing of the request (step 710). If an error has not occurred, object A sends a message to object B to further process the request (step 712). Object B processes the request (step 714). A determination is made as to whether an error has occurred (step 716). Thereafter, object B sends a message object C to provide further processing for the request (step 718). Object C processes the request (step 720) and a determination is made as to whether an error has occurred (step 722). If an error has not occurred, the process then returns the results back to the client application through object B and object A (step 724) with the process terminating thereafter.

With reference again to step 722, if an error has occurred, the exception object is called, using a message, to add context specific information into a data structure (step 726). Thereafter, the data structure is returned to object B (step 728). At this time, object B, knowing an error has occurred in the call to object C, sends a message to the exception object to add context specific information into the data structure (step 730). This data structure is returned to object A (step 732), which processes the request in view of the errors passed back to it in step 708.

Again, a determination is made as to whether an error occurs in view of the previous errors (step 710). If an error has occurred in processing by object A, the process then calls the exception object to add context specific information into the data structure (step 734). Thereafter, the exception stack is returned to the calling object, the client object (step 736). The client object, knowing that an error has occurred in the message to object A, returns the exception stack to the caller (step 740) for use in a user response (step 742) with the process terminating thereafter.

Figure 8:
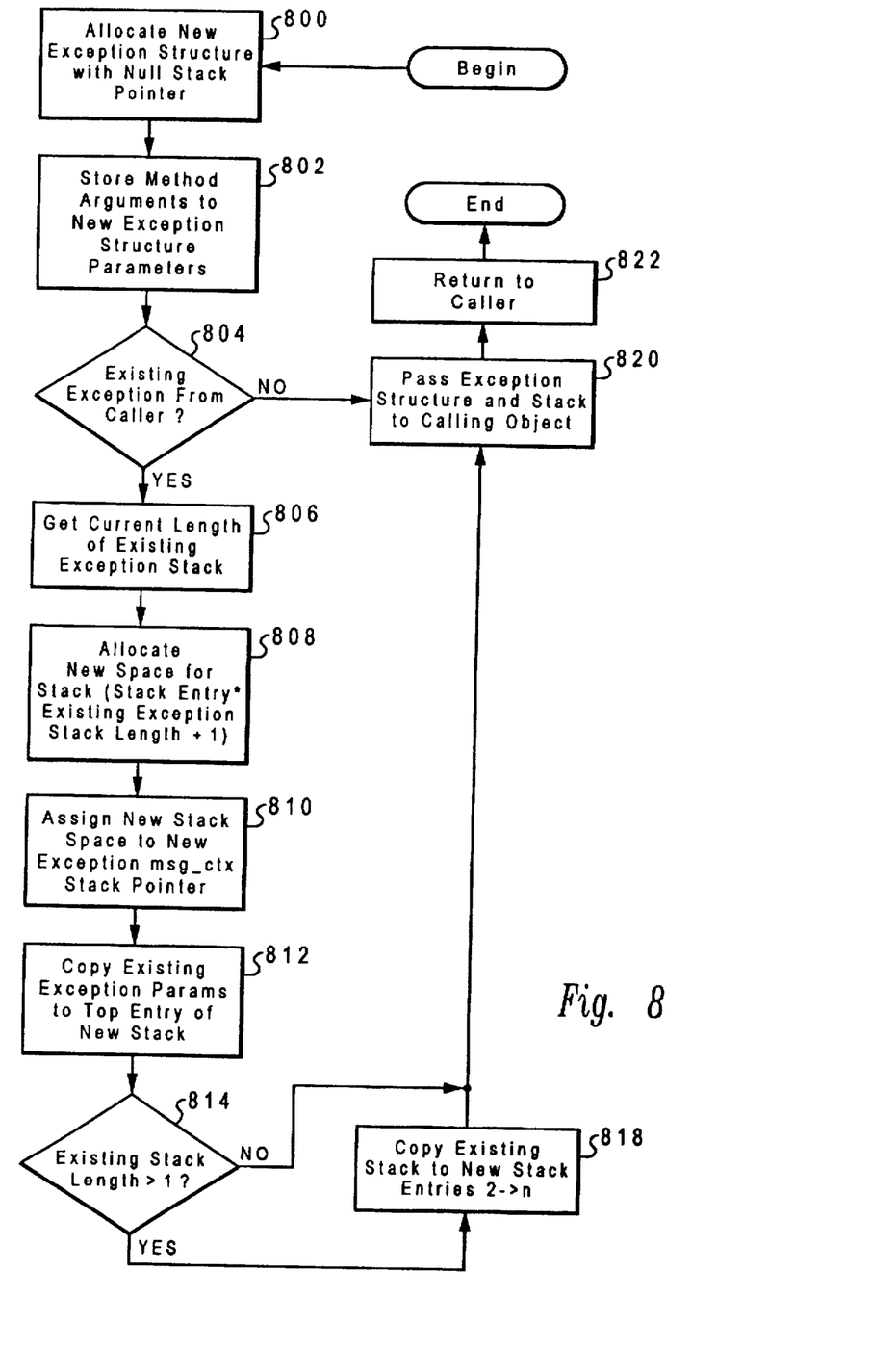
FIG. 8 is a flowchart of a process for an exception object employed to manage exception stack data structures in accordance with the preferred embodiments of the present invention.

With reference now to FIG. 8, a flowchart of a process for an exception object employed to manage data structures containing error information is depicted in accordance with the preferred embodiments of the present invention. The process begins by allocating a new exception structure with a null stack pointer (step 800). The process then stores arguments to the new exception structure parameters relating to the error (step 802). The process then determines whether an existing exception is present from the calling object (step 804). If an existing exception is present for the calling object, the process obtains the current length of the existing exception stack containing the existing exception (step 806). New space is allocated for a new exception stack (step 808). The new space allocated for the new exception stack is assigned to the new exception msg_ctx stack pointer (step 810).

Thereafter, existing exception parameters are copied to the top entry of the new exception stack (step 812). A determination is made as to whether the existing stack length is greater than one (step 814). If the existing stack has a length greater than one, the process then copies the existing stack to exception structure new stack entries (step 818). The process then passes the exception structure and stack to the calling object (step 820) and the process flow returns to the calling object (step 822). With reference again to step 814, if the existing exception stack data structure is not greater than one, the process directly passes the new exception stack to the calling object (step 820). The process also returns the new exception structure to the calling object if an existing exception is not associated with the calling object in step 804.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for managing exceptions occurring during an execution of a plurality of objects in an object-oriented environment, the method comprising:

receiving a call from a calling object, the call requiring processing by the plurality of objects;

storing error information from each of the plurality of objects in which an error occurred in a data structure;

in response to an occurrence of an error and a presence of error information within the data structure, storing error information associated with the error in an exception structure; and returning said exception structure to the calling object.

2. The method of claim 1, further comprising:

in response to the presence of error information within the data structure, storing the error information from the data structure in a new data structure, wherein the new data structure is associated with the exception structure.

3. A data processing system for managing exceptions occurring during an execution of a plurality of objects in an object oriented environment, the data processing system comprising:

reception means for receiving a call from a calling object, the call requiring processing by the plurality of objects;

first storage means for storing error information from each of the plurality of objects in which an error occurred in a data structure;

second storage means, responsive to an occurrence of an error and a presence of error information within the data structure, has storing error information associated with the error in an exception structure; and return means for returning said exception structure to the calling object.

4. The data processing system of claim 3, further comprising:

error processing means, responsive to the presence of error information within the data structure, for storing the error information from the data structure in a new data structure, wherein the new data structure is associated with the exception structure.

5. The data processing system of claim 4, wherein the new data structure has a top portion and wherein the error information in the data structure is stored in the top portion of the new data structure.

6. The data processing system of claim 4, wherein the new data structure is associated with the exception structure using a pointer stored in the exception structure, the pointer pointing to the new data structure.

7. The apparatus of claim 4, wherein the data structure is a stack.

8. A method in a data processing system for managing errors occurring within a plurality of objects during processing of a message, the method comprising:

receiving the message for processing by the plurality of objects, the message originating from a first object;

storing error information in a first primary error data structure in response to an occurrence of a first error during processing of the message by the plurality of objects;

storing error information in a second primary error data structure in response to an occurrence of a second error and storing the error data in the first primary error data structure in a secondary data structure and associating the secondary data structure with the first primary error data structure, wherein the secondary data structure is separately addressable from the second primary error data structure.

9. The method of claim 8, further comprising:

storing error information in a subsequent primary error data structure in response to an occurrence of a subsequent error and storing the error data in the second primary error data structure and in the secondary data structure in a second secondary data structure and associating the second secondary data structure with the subsequent primary error data structure.

10. A data processing system for managing errors occurring within a plurality of objects during processing of a message, data processing system comprising:

reception means for receiving the message for processing by the plurality of objects, the message originating from a first object;

storage means for storing error information in a first primary error data structure in response to an occurrence of a first error during processing of the message by the plurality of the objects;

storage means for storing error information in a second primary error data structure in response to an occurrence of a second error and storing the error data in the first primary error data structure in a secondary data structure and associating the secondary data structure with the first primary error data structure, wherein the secondary data structure is separately addressable from the second primary error data structure.

11. The data processing system of claim 10, further comprising:

storage means for storing error information in a subsequent primary error data structure in response to an occurrence of a subsequent error and storing the error data in the second primary error data structure and in the secondary data structure in a second secondary data structure and associating the second secondary data structure with the subsequent primary error data structure.

12. The data processing system of claim 11, wherein the subsequent primary data structure is associated with the second secondary data structure using a pointer stored in the subsequent primary error data structure, the pointer pointing to the second secondary data structure.

13. The data processing system of claim 12, wherein the second secondary data structure has a top portion and the error data in the second primary error data structure is stored in the top portion of the second secondary data structure.

14. The data processing system of claim 10, wherein the first primary error data structure is an exception structure and the secondary data structure is a stack.

15. A storage device readable by a data processing system and encoding data processing system executable instructions for managing errors occurring during an execution of a plurality of objects, the storage device comprising:

means for receiving a message from a calling object, the message requiring processing by the plurality of objects;

means for storing error information from each of the plurality of objects in which an error occurred in a data structure;

means, responsive to an occurrence of an error and a presence of error information within the data structure, for storing error information associated with the error in an exception structure; and means for returning the exception structure to the calling object, wherein the means are activated when the storage device is connected to and accessed by a data processing system.

16. The storage device of claim 15, wherein the storage device is a hard disk drive.

17. The storage device of claim 15, wherein the storage device is read only memory for use with a data processing system.

18. The storage device of claim 15, wherein the storage device is a floppy diskette.

19. The storage device of claim 15, wherein the storage device is a memory.

* * * * *